N. RUBENSTEIN.
Knife for Cutting Cloth.
No. 223,544. Patented Jan. 13, 1880.
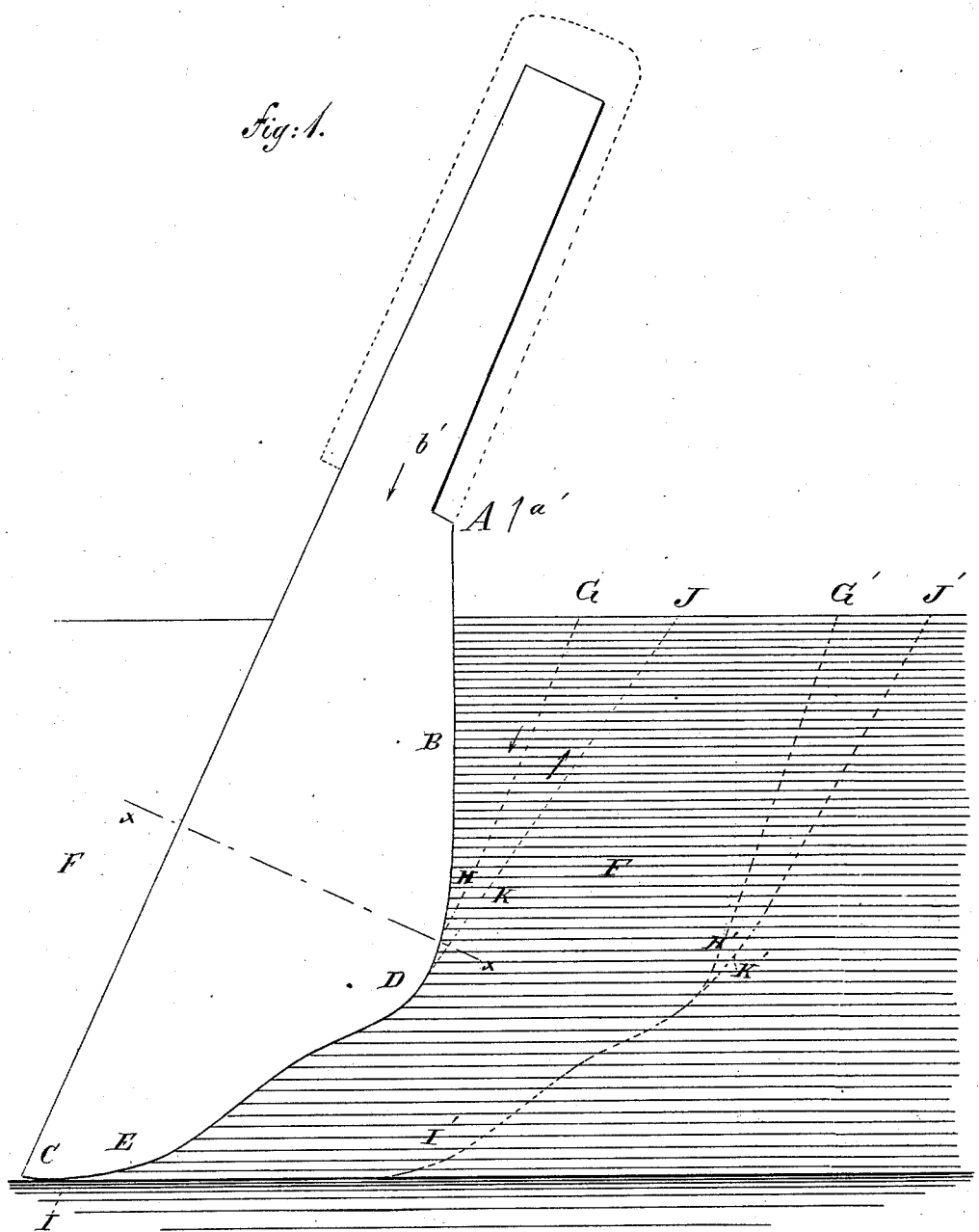

UNITED STATES PATENT OFFICE.

NATHAN RUBENSTEIN, OF CHICAGO, ILLINOIS.

KNIFE FOR CUTTING CLOTH.

SPECIFICATION forming part of Letters Patent No. 223,544, dated January 13, 1880.

Application filed November 3, 1879.

*To all whom it may concern:*

Be it known that I, NATHAN RUBENSTEIN, of Chicago, in the county of Cook and State of Illinois, have invented a new and Improved Cloth-Cutting Knife, of which the following is a specification.

The object of my invention is to provide a new and improved cloth-cutting knife for cutting several thicknesses at the same time.

The invention consists in a knife the cutting-edge of which is inclined downward toward the center of the blade and is then inclined upward to the lower end of the blade in a wave-line, thus forming a shoulder at about the middle of the cutting-edge.

In the accompanying drawings, Figure 1 represents a side elevation of my improved knife, and Fig. 2 represents a cross-section of the same on the line $x\ x$, Fig. 1.

Similar letters of reference indicate corresponding parts.

The knife is made of steel, and is provided with a suitable handle, as is indicated by the dotted lines in Fig. 1. The cutting-edge is inclined downward in a very slight curve from the point A to a point near the middle of the blade, and forms the cutting-edge B, is then inclined in a curved line toward the lower end, C, of the blade, and forms the shoulder and cutting-edge D, and is then slightly curved inward and then outward again near the end C of the blade and forms the cutting-edge E.

F F represent several layers of cloth that are to be cut, the entire thickness of these layers being from three to four inches.

The operation is as follows: The knife, as represented in Fig. 1, has just completed the downward cut indicated by the line G H I. This cut was made partly by the cutting-edges E and D, and partly by the cutting-edge B, extending from A to D. If the knife is now withdrawn in the direction of the arrow $a'$ the cut K J will be made by the cutting-edge D. The blade is never entirely withdrawn, but the lower parts always remain in the cut. If the knife is now forced downward in the direction of the arrow $b'$ the cutting-edges E and D will cut through the cloth, as will also the cutting-edge B, and will make the cut G′ H′ I′, the main part of which, however, is cut by the parts E and D. In withdrawing the knife a cut, K′ J′, is made.

The knife thus acts as two knives, cutting both in its downward and upward motion, and uses a different cutting-edge for each cut, the different edges being more or less required according to the direction of the cut. Straight or curved lines can be cut in this manner with much greater rapidity and ease than with the knives that have been in use heretofore.

This improved knife never gets hot, can be conveniently handled, cuts through three to four inches of thick and heavy cloth or like material, and makes a clean cut. As the knife is never entirely withdrawn from the cut, all slipping and false cutting is avoided, for as soon as pressure is exerted upon the knife the small recess in the cutting-edge between the parts E and D begins to cut into the cloth and guides the knife, and also prevents dragging of the cloth. This knife can also be attached to machinery.

Having thus described my invention, I claim as new and desire to secure by Letters Patent—

As an improved article of manufacture, the cloth-cutting knife herein shown and described, and consisting of a blade provided with a cutting-edge, B, inclining toward the center of the blade, curved to form the cutting-edge shoulder D, then slightly recessed and inclined toward the end C, and forming the cutting-edge E at the end of the blade, as set forth.

NATHAN RUBENSTEIN.

Witnesses:
 RICHARD STEVENS,
 SAML. E. SIMPSON.